US007840998B2

(12) United States Patent
Rommelmann et al.

(10) Patent No.: US 7,840,998 B2
(45) Date of Patent: Nov. 23, 2010

(54) SYSTEM AND METHOD FOR AUTHENTICATION OF REPLACEABLE MODULES

(75) Inventors: Heiko Rommelmann, Penfield, NY (US); Neil A. Frankel, Rochester, NY (US); Alberto Rodriguez, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1193 days.

(21) Appl. No.: 11/133,599

(22) Filed: May 20, 2005

(65) Prior Publication Data

US 2006/0265742 A1 Nov. 23, 2006

(51) Int. Cl.
*G06F 12/14* (2006.01)

(52) U.S. Cl. ........................................................ 726/17

(58) Field of Classification Search ....................... None
See application file for complete search history.

(56) References Cited

U.S. PATENT DOCUMENTS 5,629,981 A 5/1997 Nerlikar
6,016,409 A 1/2000 Beard et al.
6,377,764 B1 4/2002 Morris-jones
6,418,283 B1 * 7/2002 Wegman et al. ............. 399/106
6,532,351 B2 * 3/2003 Richards et al. ............. 399/111
6,865,349 B2 3/2005 Silence et al.
2005/0028100 A1 2/2005 Rommelmann et al.
2005/0091338 A1 * 4/2005 de la Huerga ............... 709/217
2005/0240305 A1 * 10/2005 Bogash et al. .............. 700/242

* cited by examiner

*Primary Examiner*—Brandon S Hoffman
(74) *Attorney, Agent, or Firm*—Wiggin and Dana LLP

(57) ABSTRACT

A module installable in a machine includes a memory device attached thereto for storing electronic data associated with the module. The memory device allows an individual to verify the authenticity or inauthenticity of the module without having to install the module into the machine. The memory device includes a sensory signal output device (e.g., a visual, audible, or tactile output device) that provides a sensory signal indicating authenticity or inauthenticity of the module. To verify authenticity or inauthenticity of the module, the individual initiates a query signal, for example by activating a switch on the module or by using a handheld antenna to impart an electromagnetic field onto the CRUM, and checks for the sensory signal output by the CRUM. The sensory signal may be capable of communicating a visual or audible trademark associated with the module. Data stored in the CRUM may include anti-arbitrage variables associated with the module.

20 Claims, 3 Drawing Sheets

SYSTEM AND METHOD FOR AUTHENTICATION OF REPLACEABLE MODULES

BACKGROUND

The present disclosure relates to replaceable modules, also known as "customer replaceable units" or CRUs. More specifically, the present disclosure relates to a system and method for authentication of replaceable modules using electronically-readable memory devices associated with the modules, also known as "customer replaceable unit monitors" or CRUMs.

A common trend in machine design is to organize a machine on a modular basis, wherein certain distinct subsystems of the machine are bundled together into modules which can be readily removed from the machine and replaced with new modules of the same or similar type. A modular design facilitates great flexibility in the business relationship with the customer. By providing subsystems in discrete modules, visits from a service representative can be made very short, since all the representative has to do is remove and replace a defective module. Actual repair of the module may take place remotely at the service provider's premises. Further, some customers may wish to have the ability to buy modules "off the shelf," such as from an equipment supply store. Indeed, it is possible that a customer may lease the machine and wish to buy a supply of modules as needed. Further, the use of modules, particularly for expendable supply units (e.g., copier and printer toner bottles) are conducive to recycling activities. In addition, modules may be used for anti-theft or security purposes, for example where the module may be removed by the user to disable the machine (e.g., face plates on automobile radios and wireless network cards installed in laptop computers).

In order to facilitate a variety of business arrangements among manufacturers, service providers, and customers, it is known to provide these modules with CRUMs, which, when the module is installed in the machine, enable the machine to both read information from the CRUM and also write information to the CRUM. The information read from, or written to, the CRUM may be used by the machine to perform various functions.

Since these modules have significant value, they are often targeted by counterfeiters or unauthorized remanufacturers. One method of dealing with counterfeit or otherwise unauthorized goods is to incorporate a CRUM into the module and design the product software and hardware to appropriately interact with the CRUM. For example, U.S. Pat. No. 6,016,409 entitled "System For Managing User Modules in a Digital Printing Apparatus", which is incorporated by reference herein in its entirety, describes a machine that checks data in the CRUM to ensure that the CRUM is authorized for use with the machine and, if the module is determined to be unauthorized, displays a warning that the machine's warranty is in danger of being voided. While this arrangement is effective in reducing the use of unauthorized modules, it is limited in that the authentication of the module cannot be done without access to the machine or without access to some other external device effective to read the data stored within the CRUM. At times it is useful for individuals such as manufacturer's representatives, maintenance personnel, distributors, sales persons, purchasers, and end users to authenticate the module on a stand-alone basis.

BRIEF SUMMARY

According to one aspect, there is provided a module installable in a machine, where the module comprises a memory device having stored therein electronic data associated with the module. When the module is not installed in the machine, the memory device provides a sensory signal indicative of authenticity or inauthenticity of the module in response to a query signal received by the memory device.

According to another aspect, there is provided a method of indicating authenticity or inauthenticity of a module installable in a machine while the module is not installed in the machine. The method comprises: receiving a query signal at the module; and providing a sensory signal from the module in response to the query signal, the sensory signal being indicative of authenticity or inauthenticity of the module.

According to yet another aspect, there is provided a printing apparatus comprising at least one module that is removable from the printing apparatus. The module comprises a memory device having stored therein electronic data associated with the module. When the module is not installed in the printing apparatus, the memory device provides a sensory signal indicative of authenticity or inauthenticity of the module in response to a query signal received by the memory device.

BRIEF DESCRIPTION OF THE DRAWING

Referring now to the figures, which are exemplary embodiments, wherein like items are numbered alike.

DETAILED DESCRIPTION

Figure 1:
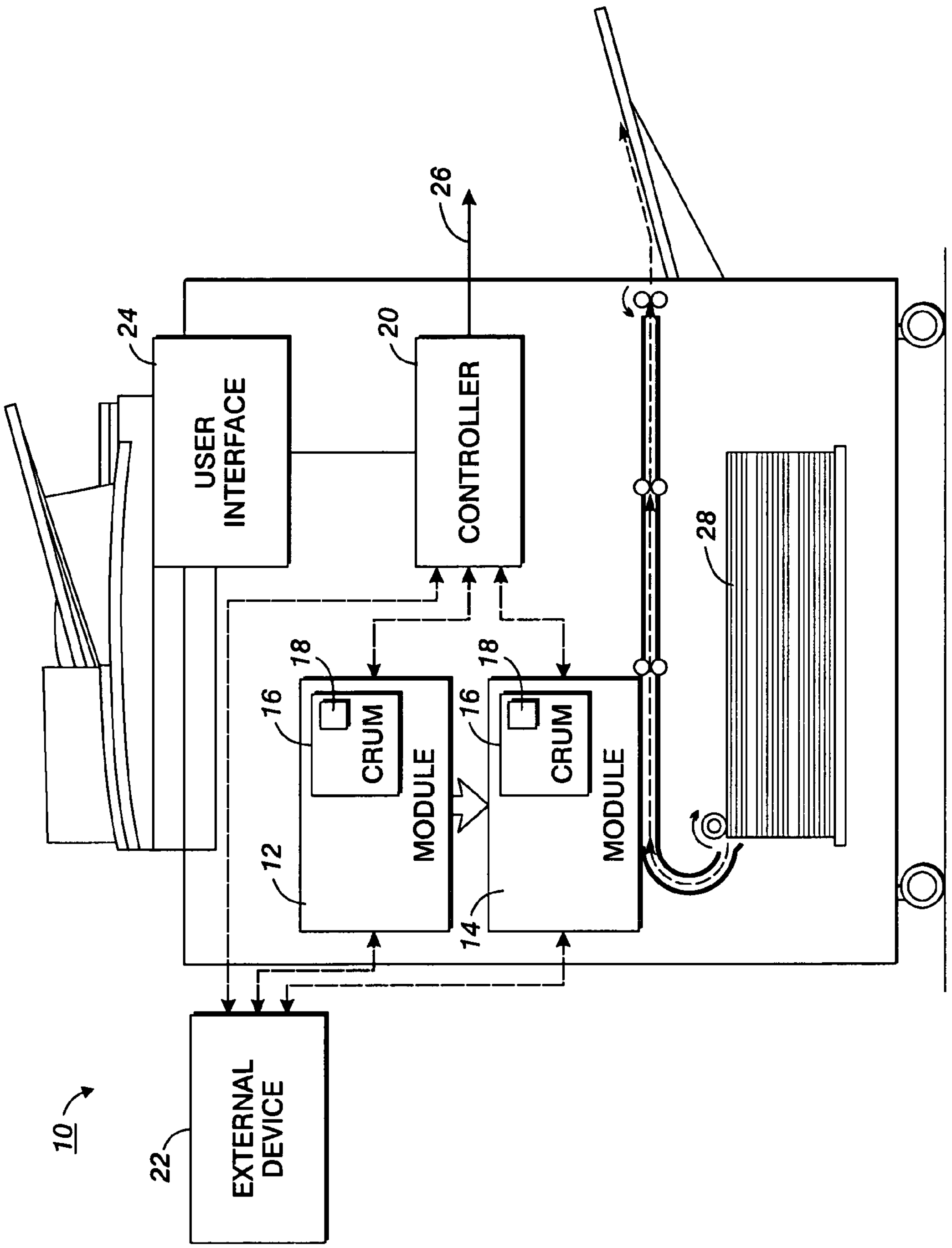
FIG. 1 is a schematic depiction of a machine including replaceable modules, each having a memory device attached thereto.

FIG. 1 is a schematic depiction of a machine 10 including replaceable modules 12 and 14, also known as "customer replaceable units" or CRUs. Attached to each of the modules 12 and 14 is an electronically-readable memory device 16, also known as a CRUM (Customer Replaceable Unit Monitor). Typically, each CRUM 16 includes a non-volatile memory, such as in the form of an EEPROM (Electrically Erasable Programmable Read Only Memory), which retains data relevant to the identification, function, and performance of the respective module 12 or 14. Because it includes a non-volatile memory, the CRUM can act as a "scratch pad" for retaining the data stored therein, which travels with the replaceable modules 12 and 14, even when the modules 12 and 14 are not installed in the machine 10.

The CRUM 16 of the present embodiment allows an individual to verify the authenticity or inauthenticity of the module 12 or 14 without having to install the module 12 or 14 into the machine 10. Each CRUM 16 includes a sensory signal output device 18 (e.g., a visual, audible, or tactile output device) that provides a sensory signal indicating authenticity or inauthenticity of the respective module 12 or 14. As used herein, a 'sensory signal' is any signal discernable by one or more of the human senses: sight, hearing, touch, smell, and taste. To verify authenticity or inauthenticity of the module 12 or 14, the individual initiates a query signal, for example by activating a switch on the module 12 or 14 or by using a handheld antenna to impart an electromagnetic field onto the CRUM 16, and checks for the sensory signal output by the CRUM 16. As will be discussed in further detail hereinafter, the sensory signal may communicate a visual or audible trademark associated with the module 12 or 14. The sensory signal may also communicate other data stored in the CRUM 16, such as anti-arbitrage variables (e.g., market region codes, field of use codes, etc.) associated with the module 12 or 14. By checking that the appropriate sensory signal is output, the individual can verify that the module 12 or 14 is authentic. For example, the individual may verify that the module 12 or 14 is not counterfeit, arbitraged (gray marketed), and/or refurbished in an unauthorized manner.

For purposes of discussion herein, the machine 10 is depicted as a printing apparatus, such as a digital printer of the ink jet or "laser" (electrophotographic or xerographic) variety, or a digital or analog copier. The modules 12 and 14 are depicted as hardware devices related to printing, such as a marking material supply module and a marking device module, respectively. It is contemplated, however, that the machine 10 may be any electrical, electronic, mechanical, electromechanical device configured to perform one or more functions, and the modules 12 and 14 may be any component, group of components, system, or subsystem of the machine 10. For example, the machine 10 may be a personal computer, and the module 12 or 14 a network card. In another example, the machine 10 may be an automobile audio system and the module 12 or 14 a removable face plate for the audio system.

In the embodiment of FIG. 1, the machine 10, includes a controller 20, which generally controls the operation of the machine 10. When the modules 12 and 14 are installed in the machine 10, the controller 20 communicates with the modules 12 and 14 via wired and/or wireless data paths, which are indicated by double-ended arrows in FIG. 1. In addition, data may be communicated between a device 22 external to the machine 10 and one or both of the CRUMs 12, 14 and the controller 20. Controller 20 may also communicate with users through a user interface 24 or through a network connection 26, such as over phone lines or the Internet.

In operation, sheets on which images are to be printed are drawn from a stack 28 and move relative to the marking device module 14, where the individual sheets are printed upon with desired images. The marking material for placing marks on various sheets by marking device module 14 is provided by marking material supply module 12. If machine 10 is an electrostatographic printer, marking material supply module 12 may include a supply of toner, while marking device module 14 includes any number of hardware items for the electrostatographic process, such as a photoreceptor or fusing device. In the well-known process of electrostatographic printing, the most common type of which is known as "xerography," a charge retentive surface, typically known as a photoreceptor, is electrostatically charged, and then exposed to a light pattern of an original image to selectively discharge the surface in accordance therewith. The resulting pattern of charged and discharged areas on the photoreceptor form an electrostatic charge pattern, known as a latent image, conforming to the original image. The latent image is developed by contacting it with a finally divided electrostatically attractable powder known as "toner." Toner is held on the image areas by the electrostatic charge on the photoreceptor surface. Thus, a toner image is produced in conformity with a light image of the original being reproduced. The toner image may then be transferred to a substrate, such as paper from the stack 28, and the image affixed thereto to form a permanent record of the image.

In the ink-jet context, the marking material supply module 12 includes a quantity of liquid ink, and may include a separate tanks for different primary-colored inks, while marking device module 14 includes a printhead. In either the electrostatographic or ink-jet context, "marking material" can include other consumed items used in printing but not precisely used for marking, such as oil or cleaning fluid used in a fusing device. Of course, depending on a particular design of a machine 10, the functions of modules 12 and 14 may be combined in a single module, or alternatively, the marking device may not be provided in an easily replaceable module such as 14. Further, there may be provided several different marking material supply modules 12, such as in a full color printer. In general, for purposes of the present embodiment, there may simply be provided one or more replaceable modules associated with the machine 10, and it is expected that, at times within the life of machine 10, one or more of these modules need to be removed or replaced. In the current market for office equipment, for example, it is typically desirable that modules such as 12 and 14 be readily replaceable by the end user, thus saving the expense of having a representative of the vendor visit the user.

There are many different types of data which could be stored in CRUM 16. In a broad sense, the CRUM could retain a serial number of the particular module, and identification of the module by the serial number can be used by the machine in which the module is installed to determine, for example, whether the particular installed module is compatible with the machine. In other types of CRUM systems, the CRUM can further act as an "odometer" to maintain a cumulative count indicating use of the module. For example, where the module is to be used with a printing apparatus, the count may indicate the number of prints which have been output using the particular module. In many contexts, a system will use the count in the CRUM to permit a certain predetermined number of times that the module may be used (e.g. a predetermined number of prints to be output with the particular module), and then block further use of the module. In more sophisticated versions of the odometer concept, there may be provided within a single CRUM provision for maintaining multiple usage counts: for instance, in addition to counting the number of times the module has been used (e.g., the number of prints output using the module) since it was built, a second count may be maintained of how many times the module was used since it was last remanufactured (refilled or repaired). In another example, a second count may serve as a check on the first count, such as in a system whereby the first count must be somehow mathematically consistent with the second count, so that any person trying to tamper with either the first or second count will have to know to make the second count consistent with the first count. Also, in particular with marking material supply modules, different independent print counts may be associated with the different supplies of color marking materials.

Another type of data which may be stored in a particular location in the non-volatile memory of the CRUM 16 may relate to specific performance data associated with the module, so that the module can be operated in an optimal, or at least advisable, manner. For instance, in the ink jet context, it is known to load data symbolic of optimal voltage or pulse width in the CRUM, so that the particular module may be optimally operated when the module is installed. In the xerographic context, it is known to load into a CRUM module specific data such as relating to the tested transfer efficiency of toner from a photoreceptor to a print sheet: this information is useful for an accurate calculation of toner consumption. Again, there may be provided any number of spaces in the of the CRUM memory for retaining information relating to different performance data.

Other types of data which may be included in the non-volatile memory in CRUM 16 include one or more serial numbers of machines, such as printers, in which the particular module is or has been installed: this may be useful for tracing faults in the module or among a population of machines. Also, if the particular module is intended to be remanufactured, another useful piece of data to be loaded into the memory can be the date of the last remanufacture of the module, as well as a code relating to some detail of the remanufacture, which may be symbolic of, for instance, a location of the remanufacture, or the specific actions that were taken on the module in a remanufacturing process.

In addition, the data stored in the CRUM 16 may include one or more anti-arbitrage variables. As used herein, an "anti-arbitrage variable" is any data that can be used to identify a market in which the module is authorized by the manufacturer to be sold and/or used, or, conversely, any data that can be used to identify a market in which the module is unauthorized for sale and/or use. Such data can be used to prevent the sale, resale, and/or use of a module in an unauthorized market. For example, the anti-arbitrage variables may include a market region code that identifies the market region, such as a geographical region, in which the module is authorized to be sold and/or used. In another example, the anti-arbitrage variables may include a field of use code that identifies a particular field of use arrangement existing between the manufacturer and the seller or user of the module that limits the sale or use of the module. The field of use code may indicate, for example, that the module is to be sold only as part of a package or that the module is to be used only for certain machines.

Figure 2:
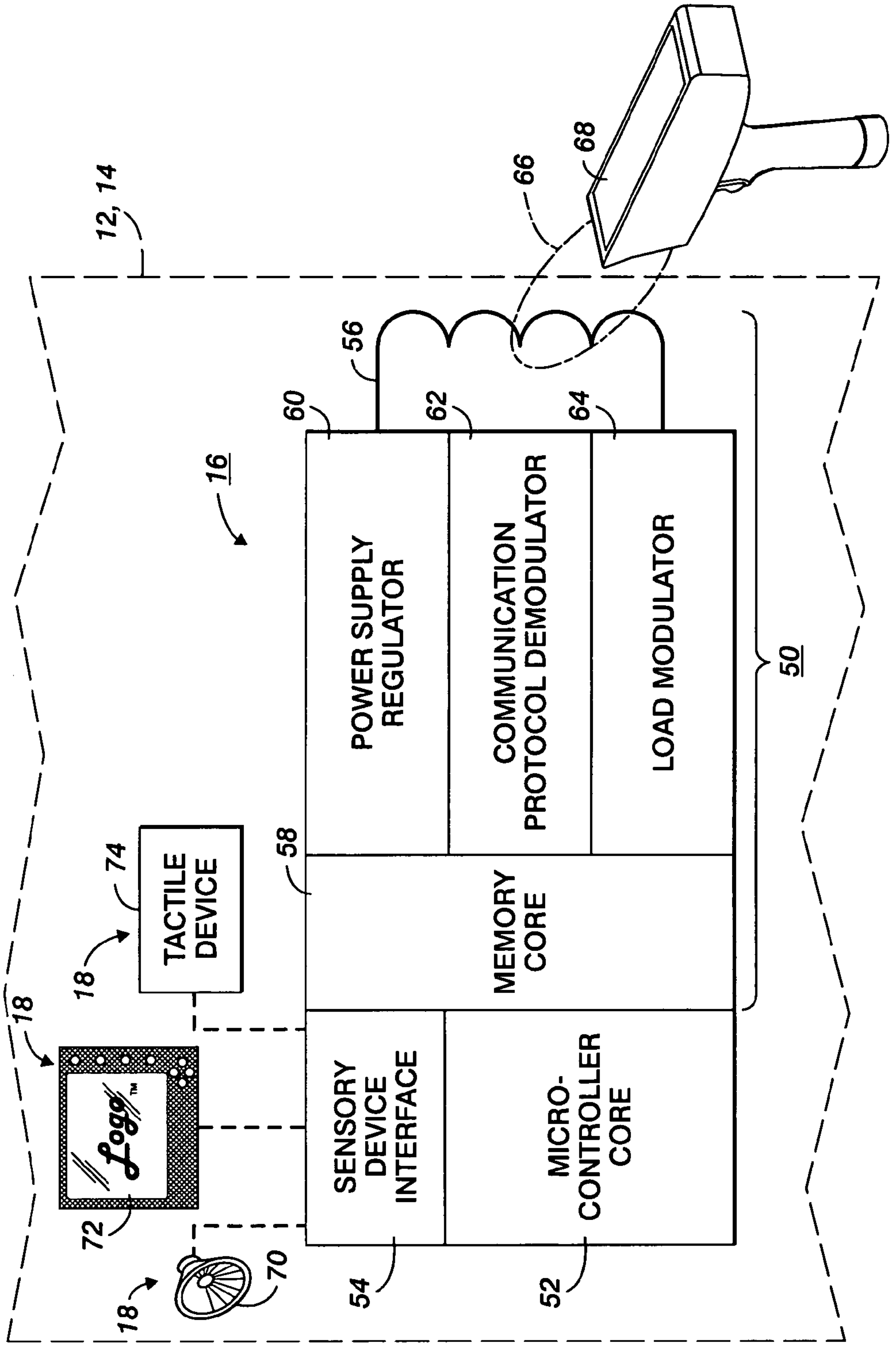
FIG. 2 is a schematic representation of one embodiment of the memory device.

FIG. 2 is a schematic representation of one embodiment of the CRUM 16 attached to a module 12 or 14. In the embodiment shown, the CRUM 16 includes a passive radio-frequency identification (RFID) tag 50 that communicates data by way of electric and/or magnetic field coupling between the tag 50 and the controller 20 of FIG. 1. The CRUM 16 further includes a microcontroller core 52 operably coupled to the RFID tag 50, and one or more sensory signal output devices 18 operably coupled to the microcontroller core 52 by a sensory device interface 54. The CRUM 16 is preferably permanently attached to a surface (either on the outside or the inside) of a particular module, such as a marking material supply module 12 or a marking device module 14; a portion of such a surface is shown in FIG. 2.

When the module 12 or 14 is installed in the machine, communication of data between the tag 20 and the controller 20 of FIG. 1 is achieved by wireless means using an antenna structure 56 forming part of the tag 50. Data storage and processing as well as radio frequency (RF) communications functions are typically performed by one or more integrated circuit chips within the tag 50. For example, the tag 50 may include: a memory core 58 (e.g., an EEPROM), which stores the data associated with the module 12 or 14; a power supply regulator 60, which rectifies and otherwise conditions alternating current induced in the antenna 56 from the received, alternating RF signal for use as a direct current power source for the tag 50, microcontroller core 52, and sensory signal output devices 18; and receiver/emitter modules 62, 64 (e.g., compatible with the ISO 14443 standard) for demodulating and decoding incoming data from the received RF signal and superimposing outgoing data on the RF signal by load variation, respectively.

To verify authenticity or inauthenticity of the module 12 or 14 when it is not installed in the machine (i.e., when there is no wired or wireless connection for transferring data between the module 12 or 14 and the controller 20), an externally-supplied RF signal 66 (e.g., the query signal) is applied to the antenna 56 by a person carrying out the authentication using, for example, a handheld device 68. The RF signal 66 provided by the handheld device 68 powers the CRUM 16 by way of electric and/or magnetic field coupling. The RF signal 66 provided by the handheld device 68 may be encoded with data needed for activating the CRUM 16; however, it is contemplated that the RF signal 66 may simply be an alternating RF signal (e.g., the "carrier wave" only). In response to receiving the RF signal 66, the microcontroller core 52 provides an output signal to the display device interface 54, which amplifies or otherwise conditions the signal for output to the one or more sensory signal output device 18. In turn, the sensory signal output device 18 provides the sensory signal to the person carrying out the authentication who, in sensing the signal, can verify authenticity or inauthenticity of the module 12, 14.

In FIG. 2, three different sensory signal output devices 18 are shown: a sound generating device 70 (e.g., a speaker), a visual display 72 (e.g., an organic light emitting diode (OLED) or liquid crystal display), and a tactile device 74 (e.g., a vibrating device). Any one or more of these devices 18 may be used. For example, the sound generating device 70 may output an audible tone or a series of notes (e.g., a song or jingle) to indicate authenticity or inauthenticity of the module 12 or 14. The tactile device 74 may vibrate to indicate authenticity or inauthenticity of the module 12 or 14. The visual display 72 may provide a light or other simple visual indication of module 12 or 14 authenticity or inauthenticity. Alternatively, the visual display 72 may display data from memory core 58 related to counterfeit protection and anti-arbitrage variables. Although not shown, it is also contemplated that the sensory signal output device 18 may include an olfactory device that is capable of producing an odor, smell, scent, or the like.

In one embodiment, the visual display 72 displays a trademark associated with the module 12 or 14. For example, as indicated in FIG. 2, the trademark of the module manufacturer, remanufacturer, distributor, seller, repair organization, or the like, may be displayed. Similarly, the sound generating device may output a trademarked sound, series of notes, song, or the like. As used herein, the term "trademark" includes any one or more word, phrase, symbol or design, sound, smell, color, product configuration and product packaging, and the like, which is capable of designating the source of the module 12, 14 or services associated with the module 12, 14. The term "trademark" includes, but is not limited to, a service mark, word mark, design mark, trade name, and the like.

The microcontroller core 52 is programmed to retrieve data from the memory core 58 and output this data to the sensory device interface 54 in response to receiving the query signal. Such data may include, for example, graphics and/or audio data (e.g., for displaying a trademark), a module serial number, operation counts (e.g., number of prints for which the module is used), remanufacture codes and/or dates, and anti-arbitrage variables.

The microcontroller core 52 may be programmed to simply retrieve any data from the memory core 58 and initiate the sensory output signal upon receiving the query signal. Alternatively, the microcontroller core 58 may be programmed to perform more complex functions to aid the user in verifying authenticity or inauthenticity of the module 12 or 14. For example, the microcontroller core 52 may be programmed to verify the arrangement of memory (e.g., by verifying data content, location and/or query response times) in the memory core 58 to determine if the module 12 or 14 has been tampered with (as may be the case with unauthorized remanufacture). In another example, the microcontroller core 52 may be programmed to determine if the module 12 or 14 has been tampered with by checking the consistency between module usage data (e.g., module usage counts) and other data stored in the memory core 58. If, in either of these examples, the microcontroller core 58 determines that the module 12 or 14 has been tampered with, the microcontroller core 58 may cause the sensory signal output device 18 to output a warning.

Figure 3:
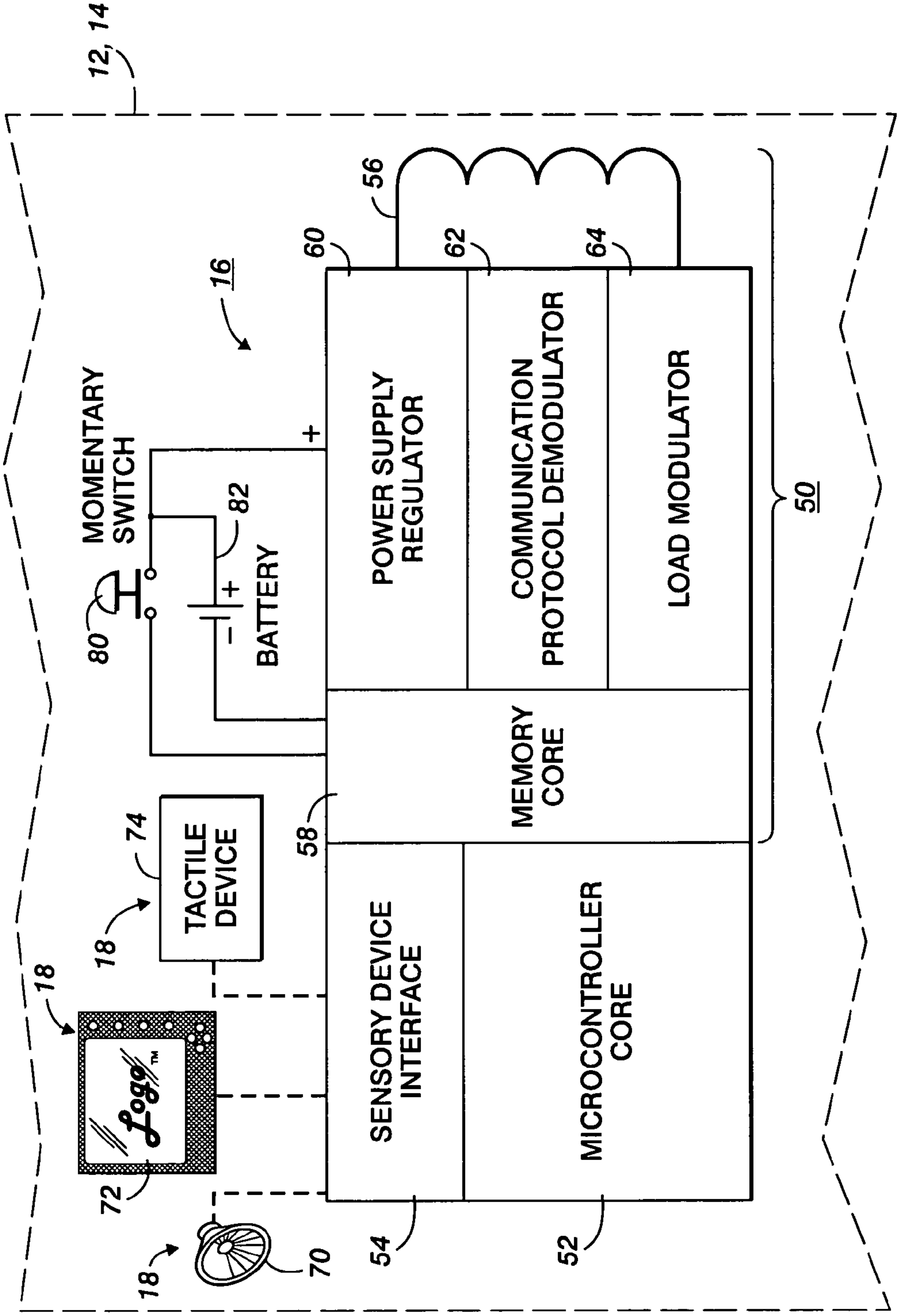
FIG. 3 is a schematic representation of an alternative embodiment of the memory device.

FIG. 3 is a schematic representation of an alternative embodiment of the CRUM 16. In the embodiment of FIG. 3, a person carrying out the authentication of the module 12 or 14 closes a switch 80 (e.g., a momentary switch, pushbutton, or the like) to apply voltage (e.g., the query signal) from a battery 82 to the CRUM 16. The battery 82 (e.g., a thin power source such as that manufactured by Power Paper Ltd. of Israel) is attached to the module 12 or 14 and provides operating power to the microcontroller core 52 and sensory signal output device 18. Advantageously, the embodiment of FIG. 3 eliminates the need for the person carrying out the authentication to use a handheld antenna for powering the CRUM, as is the case with the embodiment of FIG. 2.

In the embodiment of FIG. 3, the tag 50 may be a passive RFID tag, as in the embodiment of FIG. 2, or the tag 50 may be an active RFID tag, which uses power provided by the battery 82 to provide an output signal for communicating with the controller 20 of FIG. 1.

While the CRUMs 16 shown in FIGS. 2 and 3 employ RFID technology, it is contemplated that other wireless technology may be used. For example, wireless technologies employing infrared, ultrasound, optical, or the like could be used. In addition, rather than using wireless technology, the CRUMs 16 may employ electrical terminals which mate with electrical terminals on the controller 20 of FIG. 1 for providing wired transmission of data between the CRUMs 16 and controller 16.

By providing a sensory output signal, the CRUM described herein allows an individual such as, for example, a manufacturer's representative, maintenance person, distributor, sales person, purchaser, and end user to verify the authenticity or inauthenticity of a module on a stand-alone basis, where the module is not installed in its associated machine.

It should be understood that any of the features, characteristics, alternatives or modifications described regarding a particular embodiment herein may also be applied, used, or incorporated with any other embodiment described herein.

A number of embodiments of the present invention have been described. Nevertheless, it will be understood that various modifications may be made without departing from the spirit and scope of the invention. Accordingly, other embodiments are within the scope of the following claims.

What is claimed is:

1. A module comprising:

a memory device attached to the module, the module being installable in a machine, the memory device having stored therein electronic data associated with the module, the memory device including a sensory signal output device, wherein when the module is not installed in the machine, the sensory signal output device provides a sensory signal indicative of authenticity or inauthenticity of the module in response to a query signal initiated by a user and received by the memory device, the sensory signal indicating whether installation of the module in the machine is authorized, the user is characterized as an individual authorized to initiate the query signal, the query signal is initiated without physical contact between the user and the module, and inauthenticity of the module is characterized by installation of said module being not in accordance with warranty conditions for the machine.

2. The module of claim 1, wherein the sensory signal is capable of communicating a trademark associated with the module.

3. The module of claim 1, wherein the data stored in the memory device includes an anti-arbitrage variable.

4. The module of claim 1, wherein operating power for the memory device is provided at least in part by an electromagnetic field associated with the query signal.

5. The module of claim 4, wherein the memory device includes a radio frequency identification tag and the query signal is a wireless signal provided by a radio frequency identification reader.

6. The module of claim 5, wherein said wireless signal is supplied to the module by a handheld device.

7. The module of claim 1, further comprising:

a battery associated with the memory device.

8. A method of indicating authenticity or inauthenticity of a module installable in a machine, comprising:

receiving a query signal at the module while the module is removed from the machine, the module being installable in the machine and the query signal being initiated by a user; and providing a sensory signal from a sensory signal output device included in the module in response to the query signal, the sensory signal being indicative of authenticity or inauthenticity of the module and indicating whether installation of the module in the machine is authorized, wherein the user is characterized as an individual authorized to initiate the query signal, the query signal is initiated without physical contact between the user and the module, and inauthenticity of the module is characterized by installation of said module being not in accordance with warranty conditions for the machine.

9. The method of claim 8, wherein providing the sensory signal includes communicating a trademark associated with the module.

10. The method of claim 8, wherein the sensory signal is provided by a memory device associated with the module, the memory device having stored therein electronic data associated with the module.

11. The method of claim 10, wherein operating power for the memory device is provided at least in part by an electromagnetic field associated with the query signal.

12. The method of claim 11, wherein the memory device includes a radio frequency identification tag and the query signal is a wireless signal provided by a radio frequency identification reader.

13. The method of claim 12, wherein said wireless signal is supplied to the module by a handheld device.

14. The method of claim 10, wherein the data stored in the memory device includes an anti-arbitrage variable.

15. A printing apparatus comprising:

a module installable in and removable from the printing apparatus, the module including:

a memory device having stored therein electronic data associated with the module, the memory device including a sensory signal output device, wherein when the module is not installed in the printing apparatus, the sensory signal output device provides a sensory signal indicative of authenticity or inauthenticity of the module in response to a query signal initiated by a user and received by the memory device, the sensory signal indicating whether installation of the module in the printing apparatus is authorized, the user is characterized as an individual authorized to initiate the query signal, the query signal is initiated without physical contact between the user and the module, and inauthenticity of the module is characterized by installation of said module being not in accordance with warranty conditions for the machine.

16. The printing apparatus of claim 15, wherein the sensory signal is capable of communicating a trademark associated with the module.

17. The printing apparatus of claim 15, wherein the data stored in the memory device includes an anti-arbitrage variable.

18. The printing apparatus of claim 15, wherein the memory device includes a radio frequency identification tag and the query signal is a wireless signal provided by a radio frequency identification reader.

19. The printing apparatus of claim 18, wherein said wireless signal is supplied to the module by a handheld device.

20. The printing apparatus of claim 15, wherein the module includes hardware for electrostatographic printing.

* * * * *